United States Patent
Kavaler

(10) Patent No.: US 8,264,401 B1
(45) Date of Patent: Sep. 11, 2012

(54) MICRO-RADAR, MICRO-RADAR SENSOR NODES, NETWORKS AND SYSTEMS

(75) Inventor: Robert Kavaler, Kensington, CA (US)

(73) Assignee: Sensys Networks, Inc., Berkeley, CA (US)

( * ) Notice: Subject to any disclaimer, the term of this patent is extended or adjusted under 35 U.S.C. 154(b) by 0 days.

(21) Appl. No.: 13/452,892

(22) Filed: Apr. 22, 2012

Related U.S. Application Data

(60) Provisional application No. 61/581,620, filed on Dec. 29, 2011, provisional application No. 61/582,157, filed on Dec. 30, 2011, provisional application No. 61/623,044, filed on Apr. 11, 2012.

(51) Int. Cl.
*G01S 13/08* (2006.01)
(52) U.S. Cl. ........................................ 342/128; 342/136
(58) Field of Classification Search ........... 342/118–146
See application file for complete search history.

(56) References Cited

U.S. PATENT DOCUMENTS

| | | | |
|---|---|---|---|
| 2,709,252 A | 5/1955 | Tasker |
| 3,174,146 A | 3/1965 | Bossler et al. |
| 3,182,312 A | 5/1965 | Daniels |
| 3,241,106 A | 3/1966 | Du Vivier |
| 3,582,620 A | 6/1971 | Noetinger |
| 3,626,413 A | 12/1971 | Zachmann |
| 3,838,421 A | 9/1974 | Dasse-Hartaut et al. |
| 4,167,735 A | 9/1979 | Lewis |
| 5,075,680 A | 12/1991 | Dabbs |
| 5,189,425 A | 2/1993 | Dabbs |
| 5,274,271 A | 12/1993 | McEwan |
| 5,337,082 A | 8/1994 | Fredericks |
| 5,345,471 A | 9/1994 | McEwan |
| 5,361,070 A | 11/1994 | McEwan |
| 5,374,932 A | 12/1994 | Wyschogrod et al. |
| 5,422,607 A | 6/1995 | McEwan |
| 5,457,394 A | 10/1995 | McEwan |
| 5,461,384 A | 10/1995 | Sieprath et al. |
| 5,465,094 A | 11/1995 | McEwan |

(Continued)

FOREIGN PATENT DOCUMENTS

DE 19949737 A1 4/2001

(Continued)

OTHER PUBLICATIONS

McEwan, "Single Zone Motion Sensor Model DPD", Nov. 10, 2011 web site snapshot, file name DPD.pdf.

(Continued)

*Primary Examiner* — Timothy A Brainard
(74) *Attorney, Agent, or Firm* — Earle Jennings

(57) ABSTRACT

A micro-radar is disclosed that is operated based upon two Digital to Analog Converter (DAC) outputs that control its internal timing and Intermediate Frequency (IF) signal frequency. Calibration and temperature compensation is done through estimating the duty cycle of the transmit signal and possibly the reception signal that stimulate a pulse generator to create the transmit pulse and the reception pulse and adjusting one or both DAC outputs. Sensor processors, wireless sensor nodes and wireline sensor nodes are disclosed for operating the micro-radar. An integrated circuit is disclosed implementing all or portions of the micro-radar. Access points, servers as well as systems that include but are not limited to a traffic monitoring system, a traffic control system, a parking management system and/or a production management system are also disclosed.

20 Claims, 8 Drawing Sheets

U.S. PATENT DOCUMENTS

| | | |
|---|---|---|
| 5,471,162 A | 11/1995 | McEwan |
| 5,479,120 A | 12/1995 | McEwan |
| 5,497,100 A | 3/1996 | Reiser et al. |
| 5,510,800 A | 4/1996 | McEwan |
| 5,512,834 A | 4/1996 | McEwan |
| 5,517,198 A | 5/1996 | McEwan |
| 5,519,342 A | 5/1996 | McEwan |
| 5,519,400 A | 5/1996 | McEwan |
| 5,519,618 A | 5/1996 | Kastner et al. |
| 5,521,600 A | 5/1996 | McEwan |
| 5,523,760 A | 6/1996 | McEwan |
| 5,563,605 A | 10/1996 | McEwan |
| 5,573,012 A | 11/1996 | McEwan |
| 5,576,627 A | 11/1996 | McEwan |
| 5,581,256 A | 12/1996 | McEwan |
| 5,589,838 A | 12/1996 | McEwan |
| 5,609,059 A | 3/1997 | McEwan |
| 5,661,490 A | 8/1997 | McEwan |
| 5,682,164 A | 10/1997 | McEwan |
| 5,754,144 A | 5/1998 | McEwan |
| 5,757,320 A | 5/1998 | McEwan |
| 5,764,189 A | 6/1998 | Lohninger |
| 5,766,208 A | 6/1998 | McEwan |
| 5,767,953 A | 6/1998 | McEwan |
| 5,774,091 A | 6/1998 | McEwan |
| 5,804,921 A | 9/1998 | McEwan |
| 5,805,110 A | 9/1998 | McEwan |
| 5,883,591 A | 3/1999 | McEwan |
| 5,966,090 A | 10/1999 | McEwan |
| 5,986,600 A | 11/1999 | McEwan |
| 6,031,421 A | 2/2000 | McEwan |
| 6,031,504 A | 2/2000 | McEwan |
| 6,055,287 A | 4/2000 | McEwan |
| 6,060,915 A | 5/2000 | McEwan |
| 6,072,427 A | 6/2000 | McEwan |
| 6,137,438 A | 10/2000 | McEwan |
| 6,191,724 B1 | 2/2001 | McEwan |
| 6,278,965 B1 | 8/2001 | Glass et al. |
| 6,359,583 B1 | 3/2002 | Shamee |
| 6,373,428 B1 | 4/2002 | McEwan |
| 6,414,627 B1 | 7/2002 | McEwan |
| 6,426,716 B1 | 7/2002 | McEwan |
| 6,452,467 B1 | 9/2002 | McEwan |
| 6,456,231 B1 | 9/2002 | McEwan |
| 6,462,697 B1 | 10/2002 | Klamer et al. |
| 6,462,705 B1 | 10/2002 | McEwan |
| 6,466,168 B1 | 10/2002 | McEwan |
| 6,486,825 B1 | 11/2002 | Smithey |
| 6,492,933 B1 | 12/2002 | McEwan |
| 6,531,977 B2 | 3/2003 | McEwan |
| 6,535,161 B1 | 3/2003 | McEwan |
| 6,600,103 B1 | 7/2003 | Schmidt et al. |
| 6,642,854 B2 | 11/2003 | McMaster |
| 6,644,114 B1 | 11/2003 | McEwan |
| 6,662,099 B2 | 12/2003 | Knaian et al. |
| 6,747,599 B2 | 6/2004 | McEwan |
| 6,750,787 B2 | 6/2004 | Hutchinson |
| 6,914,552 B1 | 7/2005 | McEwan |
| 7,148,791 B2 | 12/2006 | Grisham et al. |
| 7,180,428 B1 | 2/2007 | LeVan et al. |
| 7,224,944 B2 | 5/2007 | McEwan |
| 7,345,623 B2 | 3/2008 | McEwan |
| 7,379,016 B1 | 5/2008 | McEwan |
| 7,446,695 B2 | 11/2008 | McEwan |
| 7,446,699 B2 | 11/2008 | McEwan |
| 7,551,703 B2 | 6/2009 | McEwan |
| 7,592,944 B2 | 9/2009 | Fullerton et al. |
| 7,864,100 B2 | 1/2011 | McEwan |
| 7,952,515 B2 | 5/2011 | McEwan |
| 7,994,968 B2 | 8/2011 | McEwan |
| 8,115,673 B1 | 2/2012 | McEwan |
| 2002/0189336 A1 | 12/2002 | McEwan |
| 2003/0025626 A1 | 2/2003 | McEwan |
| 2003/0071754 A1 | 4/2003 | McEwan |
| 2004/0168512 A1 | 9/2004 | McEwan |
| 2005/0164643 A1 | 7/2005 | McEwan |
| 2006/0074546 A1 | 4/2006 | DeKock et al. |
| 2006/0212344 A1 | 9/2006 | Marcus et al. |
| 2007/0177704 A1 | 8/2007 | McEwan |
| 2007/0192391 A1 | 8/2007 | McEwan |
| 2007/0200749 A1 | 8/2007 | McEwan |
| 2007/0210955 A1 | 9/2007 | McEwan |
| 2007/0276600 A1 | 11/2007 | King et al. |
| 2008/0048905 A1 | 2/2008 | McEwan |
| 2010/0073221 A1 | 3/2010 | McEwan |
| 2010/0214157 A1* | 8/2010 | McEwan ............ 342/173 |
| 2010/0214158 A1 | 8/2010 | McEwan |
| 2010/0245161 A1* | 9/2010 | Spreadbury ............ 342/201 |
| 2011/0221624 A1 | 9/2011 | Kavaler |

FOREIGN PATENT DOCUMENTS

JP    1035699    2/1989

OTHER PUBLICATIONS

McEwan, "Micropower Single Zone 5.8GHz Motion Sensor Model uP-DPDd", Nov. 10, 2011 web site snapshot, file name uP-DPD.pdf.

McEwan, "4-Zone 5.8GHz Motion Sensor Model FDS", Nov. 10, 2011 web site snapshot, file name FDS.pdf.

McEwan, "24 GHz Model PD-24 Motion Sensor", Nov. 10, 2011 web site snapshot, file name PD24.pdf.

McEwan, "5.8 GHz Radar Rangefinder (Dual Antenna) Model RRF58", Nov. 10, 2011 web site snapshot, file name RRF58.pdf.

McEwan, "24 GHz Radar Rangefinder (Dual Antenna) Model RRF24", Nov. 10, 2011 web site snapshot, file name RRF24.pdf.

McEwan, "24 GHz Radar Rangefinder (Single Antenna) Model RRF24S", Nov. 10, 2011 web site snapshot, file name RRF24S.pdf.

McEwan, "Micropower Impulse Radar (MIR)", Nov. 10, 2011 web site snapshot, file name MIR_Overview.pdf.

McEwan, "24 GHz Pulse Echo Radar Model PER-24", Nov. 10, 2011 web site snapshot, file name PER24.pdf.

McEwan and Hanks, "High Voltage picosecond pulse generation using avalanche diodes", Nov. 10, 2011 web site snapshot, file name SPIE_Paper.pdf.

McEwan, Energy and Technology Review, Apr. 1994, "World's Fastest Solid-State Digitizer", University of Claifornia, Lawrence Livermore Nationsl Laboratory, Nov. 10, 2011 web site snapshot, file name SSTD_article.pdf.

McEwan and Brase, Lawrence Livermore National Laboratory Lab-Wide Report 1991, "Ultra-Wideband Radar Imaging", Nov. 10, 2011 web site snapshot, file name UWB_Imaging.pdf.

Arora et al "A line in the sand: a wireless sensor network for target detection, classification, and tracking", Computer Networks: The International Journal of Computer and Telecommunications Networking—Special Issue: Military communications systems and technologies. vol. 46, Issue 5. pp. 605-634. Dec. 6, 2004.

Ditzel, et al "Low-power Radar for Wireless Sensor Networks". Proceedings of the 3rd European Radar Conference. pp. 139-141. Sep. 13-15, 2006.

Dutta, et al. "Towars Radar-Enabled Sensor Networks". The Fifth International COnference on Information Processing in Sensor Networks. Apr. 19-21, 2006.

* cited by examiner

Fig. 10 — Program system 3500

MICRO-RADAR, MICRO-RADAR SENSOR NODES, NETWORKS AND SYSTEMS

CROSS REFERENCE TO RELATED PATENT APPLICATIONS

This application claims priority to
Provisional patent application No. 61/581,620 filed Dec. 29, 2011, entitled "Micro-Radar, Micro-Radar Sensor Nodes, Networks and Systems",
Provisional patent application No. 61/582,157, filed Dec. 30, 2011, entitled "Wireless and Wireline Sensor Nodes, Micro-Radar, Networks and Systems", and
Provisional patent application No. 61/623,044, filed Apr. 11, 2012, entitled "Micro-Radar, Micro-Radar Sensor Nodes, Networks and Systems", each which is incorporated herein in their entirety.

TECHNICAL FIELD

This disclosure relates to micro-radars, radar antennas, sensor nodes adapted to interact with a micro-radar, and processors adapted to respond to the micro-radar, as well as components and systems supporting communications between the micro-radars and the processors. The processors and systems may further support traffic analysis and management of moving and/or stationary vehicles.

BACKGROUND OF THE INVENTION

There has been extensive development of radar since the 1930's for detecting aircraft and ships at a distance, often over the horizon. Such systems routinely use many kilowatts to megawatts for transmitting their radar pulses. What is disclosed herein are micro-radars that use ten milli-Watts (mW) or less of power to transmit their pulses. Micro-radars are also used to detect vehicles and determine distances, but the distances involved are typically within a few meters of the micro-radar.

SUMMARY OF INVENTION

The prior art includes a discussion that radar transmission signals in multi-GigaHertz (GHz) bands are unaffected by changing weather conditions. While this is true, the prior art overlooks some issues that the inventor has had to cope with. The inventor has found each of the following issues to seriously affect at least some installations of micro-radar:
Different manufacturing runs may alter the operating characteristics of the micro-radar, even in a laboratory setting.
Varying temperature/weather conditions may alter the operating characteristics.
Varying ground conditions for a micro-radar embedded in the ground may alter the operating characteristics.
The micro-radar components may also drift over time even when there are little or no changes in the weather or ground conditions. The component drift may also alter the operating characteristics.
Often, there may be variations in the noise in the Intermediate Frequency (IF) signal that can compromise the detection and/or distance estimate.
Often, there is a need to operate the micro-radar in a manner that minimizes power consumption. For example, in some wireless sensor nodes, there is a very limited amount of power that can be generated and/or stored by the wireless sensor node, requiring that a micro-radar use power in a frugal manner.

These operating characteristics of the micro-radar may include changes in the IF frequency and/or noise of the micro-radar and/or changes in the timing delays of the receiver. Changes in either or both of these characteristics can adversely affect a sensor's ability estimate the travel time of the radar pulse and from that render the distance estimate to an object less accurate.

The application discloses and claims several embodiments, a micro-radar, sensor nodes adapted to interact with the micro-radar, processors responding to the micro-radar, as well as systems and components supporting communications between the micro-radars and the processors. The processors and systems may further support traffic analysis and management of moving and/or stationary vehicles. The vehicles may include sections of non-magnetic materials such as aluminum, wood and/or plastics that tend to create false readings for magnetic sensors. The processors and systems may also support measurement and/or management of production processes such as chemical production, device fabrication and container filling of various items such as liquids, grains and/or saw dust.

The micro-radar will refer to a radar adapted to generate an antenna output of less than or equal to ten milli-Watts (mW). The micro-radar is adapted to operate in response to at least one output of a Digital to Analog Converter (DAC) and sometimes preferably two DAC outputs.

The DAC output may be used to generate an analog sum including an exponentially changing signal and the output of the DAC. Here are two examples of the response of the micro-radar to distinct analog sums, either or both of which may be incorporated into the micro-radar and/or its operations:
First, the micro-radar may operate in response to a first analog sum of a first DAC output, an exponentially changing signal, and a clock pulse. The response may include generating a receiver mixing signal that is asserted at a succession of time delays that are a function of the first analog sum.
Second, the micro-radar may be operated based upon a second analog sum of a second exponentially changing signal and a second DAC output to control the Intermediate Frequency of the down converted RF signal. This second sum may control a duty cycle of a pulse generating oscillator output without changing its frequency. The duty cycle may be measured as the high time divided by the period of the oscillator output.

The micro-radar may include a RF transceiver/mixer RFTM used to generate carrier signal for the antenna output and to generate the received IF signal.

The micro-radar may be operated through the control of the first and/or second DAC outputs. Some operations that may be supported include any combination of the following:
Controlling both the first and second DAC outputs to advance or retard the sweep delay relative to the distance to an object.
Setting the second DAC output to generate the IF signal as a noise reading.
And calibrating the first DAC output, and possibly the second DAC output, to establish the IF frequency.

The apparatus may further include a wireless sensor node and/or a wireline sensor node and/or a processor and/or an access point and/or a server.
The wireless sensor node may include a first instance of the micro-radar and a radio transceiver configured to send a report regarding the sweep delay for the object, when the IF signal has a peak amplitude corresponding to the received RF reflection from the object.

The wireline sensor node may be configured to operate a second instance of the micro-radar and including a wireline interface configured to send the report regarding the sweep delay for the object.

The processor may be configured to receive the report and configured to respond to the report by generating an estimate of the distance of the object from the micro-radar.

The access point may be configured to wirelessly communicate with the micro-radar via the radio transceiver to send a version the report to the processor.

And the server may be configured to communicate the version of the report from the micro-radar to the processor.

The wireless sensor node and/or the wireline sensor node may further include a sensor processor configured to control the micro-radar by at least control of the first DAC output and the second DAC output.

At least one of the sensor processor, the access point, the server and/or the processor includes at least one instance of at least one of a finite state machine and a computer accessibly coupled to a memory containing a program system comprised of program steps configured to instruct the computer.

Various implementations of the program system may include at least one of the program steps of:

Operating the micro-radar based upon control of the first DAC output and/or the second DAC output.

Receiving the IF signal to generate an ADC reading and/or an estimate of the sweep delay for the object.

Estimating the distance of the object based upon the estimated sweep delay.

Generating the report based upon the ADC reading and/or the sweep delay.

Responding to the report by sending the version of the report to the processor.

Second responding to the report and/or the version to estimate the distance of the object from the micro-radar.

Third responding to the report and/or the version to generate the size of the object.

And/or fourth responding to the distance of the object from the micro-radar by updating at least one of a traffic monitoring system, a traffic control system, a parking management system, and/or a production management system.

The apparatus may further include at least one of the traffic monitoring system, the traffic control system, the parking management system, and/or the production management system, any of which may include At least one communicative coupling to at least one of the micro-radar, the wireless sensor node, the wireline sensor node, the processor, the access point and/or the server.

The communicative coupling(s) may support communication across at least one of a wireline physical transport and/or a wireless physical transport.

BRIEF DESCRIPTION OF THE DRAWINGS

FIG. 10 shows a flowchart of the program system of FIG. 8.

DETAILED DESCRIPTION OF DRAWINGS

This disclosure relates to micro-radars, radar antennas, sensor nodes adapted to interact with a micro-radar, and processors adapted to respond to the micro-radar, as well as components and systems supporting communications between the micro-radars and the processors. The processors and systems may further support traffic analysis and management of moving and/or stationary vehicles. In some embodiments the micro-radar, sensor nodes, processors and/or systems may support production management.

Figure 1:
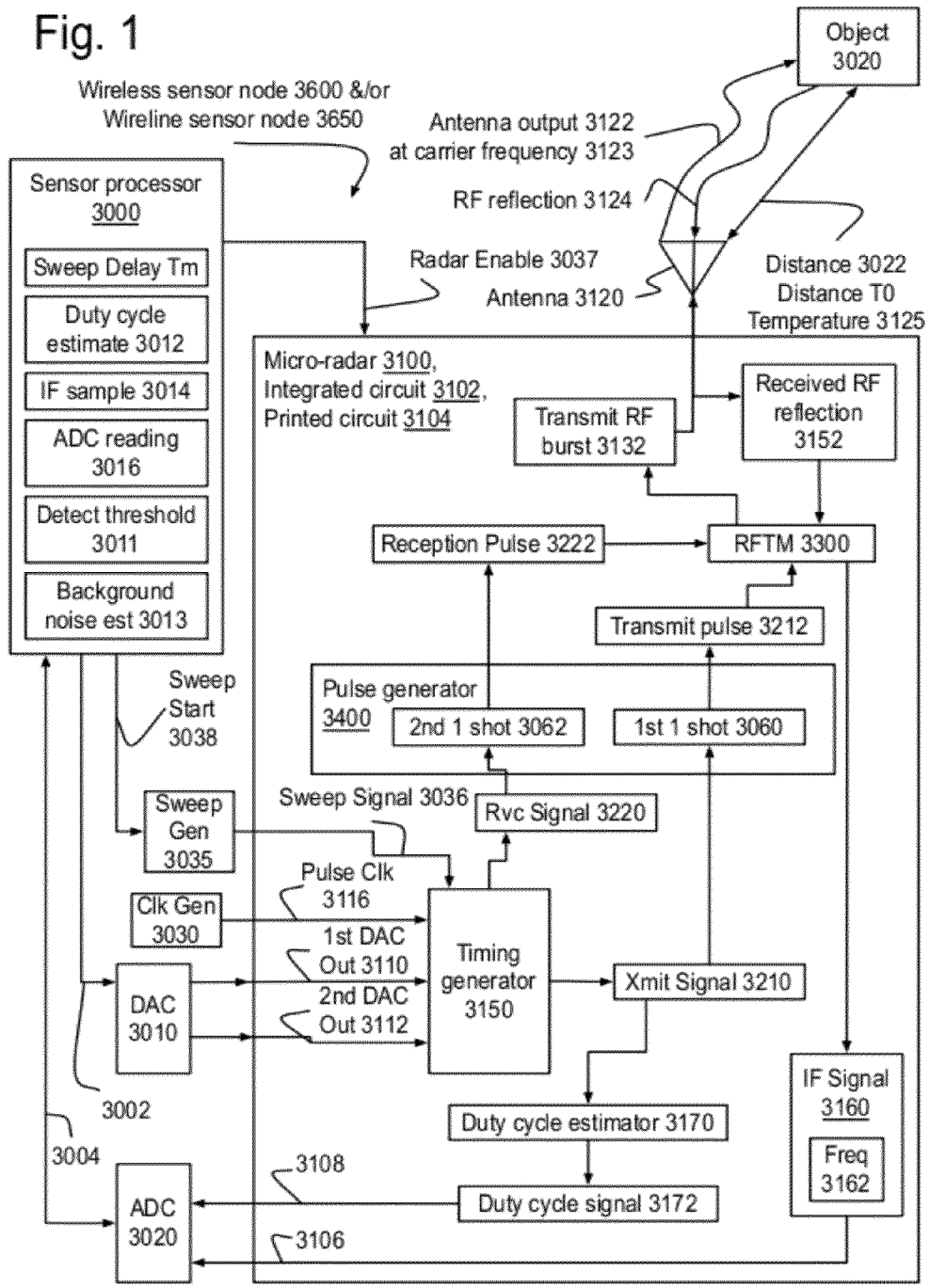
FIG. 1 shows a simplified block diagram of an example of a wireless sensor node and/or a wireline sensor node that may include a sensor processor configured to operate a micro-radar based upon a first DAC output and second DAC output.

FIG. 1 shows a simplified block diagram of an example of a wireless sensor node 3300 and/or a wireline sensor node 3310 that may include a sensor processor 3000 configured to operate a micro-radar 3100 based upon a first DAC output 3110 and second DAC output 3112.

The micro-radar 3100 is a radar that may be adapted to generate an antenna output 3122 of less than or equal to (no more than) ten milliWatts (mW) and responds to at least two outputs of a Digital to Analog Converter (DAC), which will be referred to as a DAC output.

An object 3020 may be situated at a distance 3022, for example a distance T0, from an antenna 3120 interacting with the micro-radar 3100. In many situations, the antenna and the micro-radar may be considered as located at one location, but in other situations, there may be some distance between them. To simplify this discussion, only the distance 3022 from the antenna will be discussed. The object 3020 may reflect the antenna output 3122 to generate a RF reflection 3124. The micro-radar 3100 may be adapted to generate a received RF reflection 3152 from the RF reflection 3124.

The micro-radar may use a timing generator 3150 adapted to respond to the two DAC outputs 3110 and 3112 to generate a transmit signal 3210 and a reception signal 3220 that stimulate a Radio Frequency (RF) transceiver/mixer (RFTM) 3300 to generate the antenna output 3122 and to down convert an Intermediate Frequency (IF) signal 3160 based upon and proportional to the received RF reflection 3152.

Consider the micro-radar 3100 response to the first DAC output 3110 and to the second DAC output 3112 over the clock period 3117 of a sweep clock 3116.

The sweep clock 3116 may be generated by a separate clock generator 3030. In other implementations, the micro-radar and/or the sensor processor 3000 may include the clock generator.

Figure 2A:
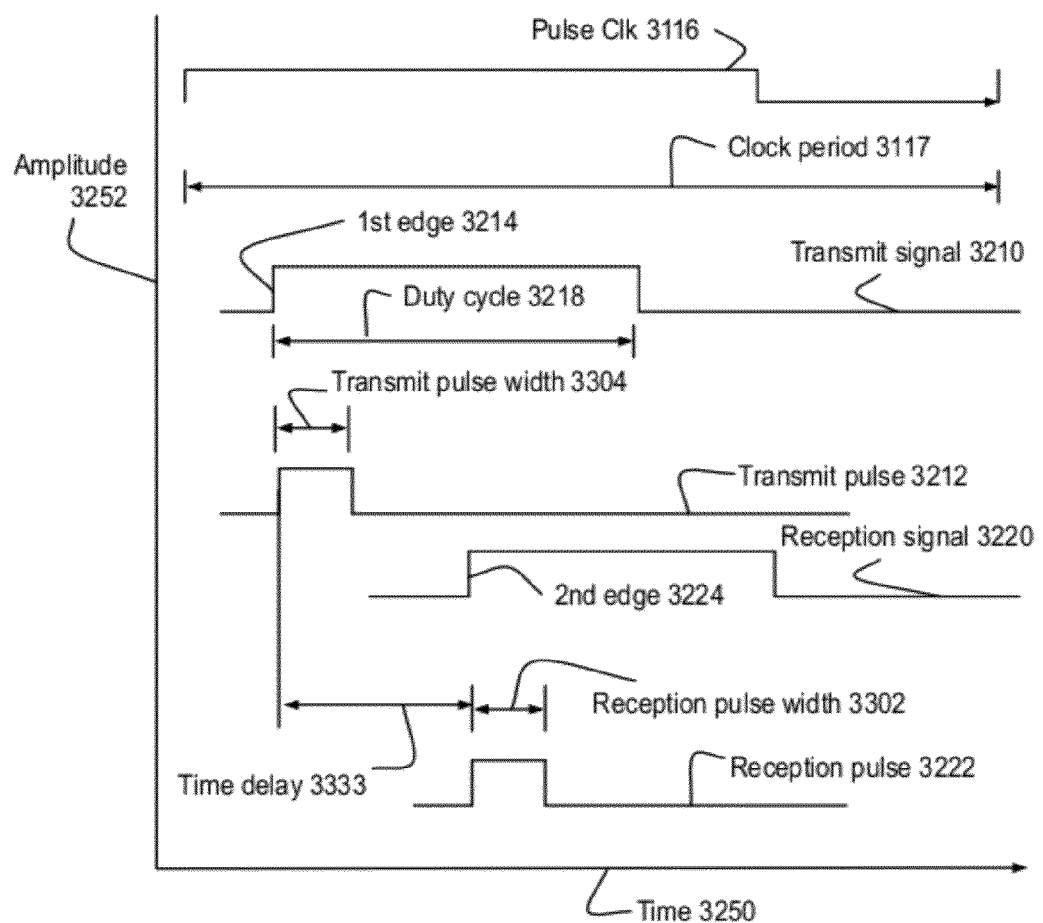
FIG. 2A shows a timing diagram of the relationship between the pulse clock, the transmit signal and the reception signal as generated by the timing generator and used by the RFTM of FIG. 1, including the time delay between the signals and/or the pulses, the pulse widths and duty cycle.

The timing generator 3150 may respond to the first DAC output 3110 by generating a transmit signal 3210 over the clock period 3117 of sweep clock 3116 as shown in FIG. 2A, which will be discussed shortly.

The timing generator 3150 may respond to the second DAC output 3112 by generating a reception signal 3220 with a time delay 3300 from the transmit signal over the sweep clock 3116 period 3117, also shown in FIG. 2A.

A first one-shot multi-vibrator 3060 may respond to the transmit signal 3210 by generating the transmit pulse 3212.

A second one-shot multi-vibrator 3062 may respond to the reception signal 3220 by generating the reception pulse 3222.

The RFTM 3300 may respond to the transmit pulse 3210 by generating a transmitted Radio Frequency (RF) burst 3132 for delivery to the antenna 3120 to generate the antenna output 3122.

The RFTM 330 may mix a received RF reflection 3152 with the transmit RF burst 3132, in response to the reception pulse 3220, to generate the IF signal 3160 with a peak amplitude 3164 at a sweep delay Tm for a distance T0 of the object 3020 from the antenna 3120.

The frequency 3160 of the IF signal 3160 is preferably about one over the compression ratio multiplied by the carrier frequency 3123 of the antenna output 3122, where the compression ratio is about one million.

A pulse generator 3400 may be used to respond to the transmit signal 3210 to generate the transmit pulse 3212 and to respond to the reception signal 3220 to generate the reception pulse 3222. The transmit signal may further stimulate a first one shot multi-vibrator 3060 to at least partly generate the transmit pulse. The reception signal may further stimulate a second one-short multi-vibrator 3060-2 to at least partly generate the reception pulse. Note that in some implementations, the reception pulse may include the transmit pulse occurring before at a time delay 3300 before it. The time delay will be shown in FIG. 2A. FIG. 2A will show the reception pulse not including the transmit pulse.

Figure 2B:
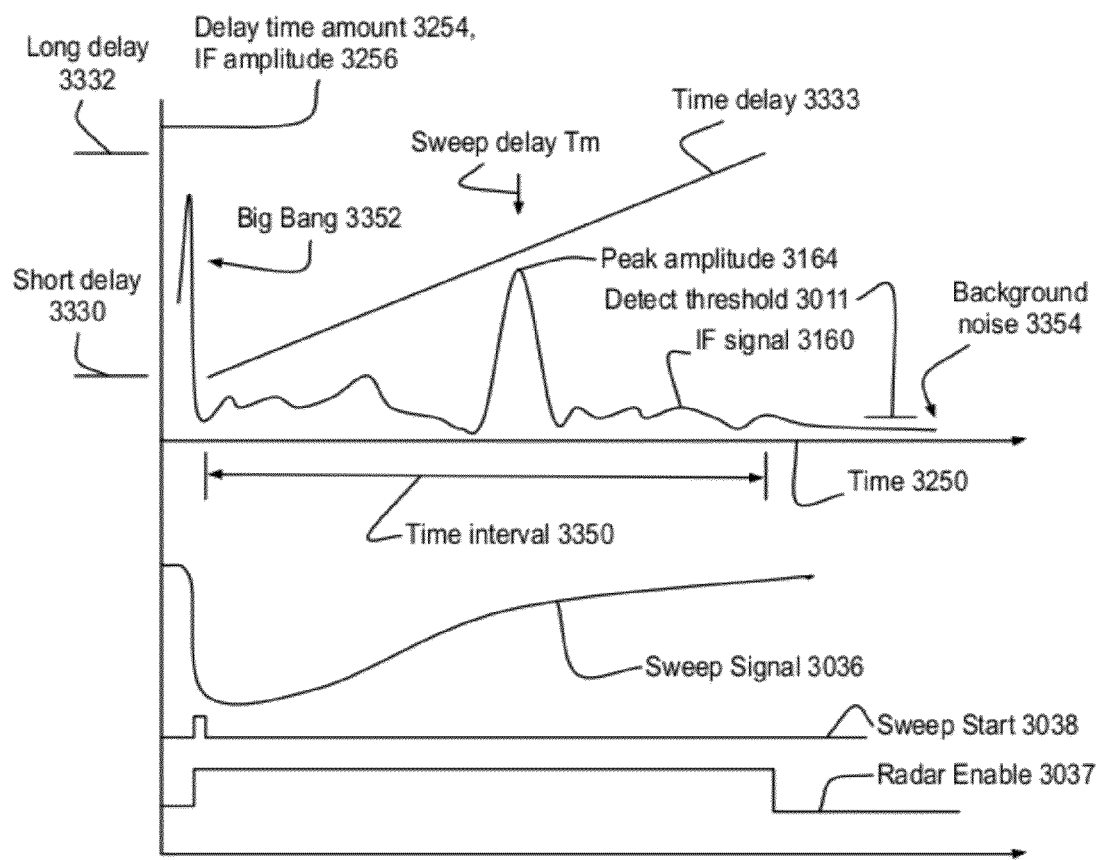
FIG. 2B shows a timing diagram sweep of the time delay from a short delay to a long delay over a time interval, as well as the IF signal over the time interval with a peak amplitude at a sweep delay Tm corresponding to the distance T0 of the object from the antenna as shown in FIG. 1.

Before discussing the timing relationships in FIGS. 2A and 2B, there are two questions to answer: Where does the compression ratio show up in this apparatus? And what is the relationship of the duty cycle 3218 of the transmit signal 3210 to compression ratio and the frequency 3162 of the IF signal 3160?

First, here is how the compression ratio shows up. The carrier frequency 3123 of the antenna output 3122 is in the GigaHertz (GHz) range. For example, in the inventor's products, which include wireless sensor nodes 3310, the carrier frequency is about 6.3 GHz. The return times for the antenna output 3122 to travel the distance T0 of 6 feet to the object 3020 and return are as the RF reflection are about 12 nanoseconds.

But the system clock for the sensor processor 3000 is about 32 KHz. This clock frequency is set low to conserve on power stored in the wireless sensor node 3310. The sensor processor cannot directly detect the reception time Tm of the RF reflection 3124 without consuming a lot more power than can be afforded.

There are RFTM 3212 and similar micro-radar 3100 circuits that held a promise of meeting these needs, in that the frequency 3162 of the IF signal 3160 is one millionth of the carrier frequency 3123, making the IF frequency about 6.3 KHz, which is within the operating frequency of the sensor processor 3000.

Because of the compression ratio, the frequency 3162 of the IF signal 3160 frequency 3162 is small enough that sensing it can be done efficiently enough for a wireless sensor node 3300.

Here is where the duty cycle and its relationship to the compression ratio and the frequency 3162 of the IF signal 3160 shows up:

The inventor obtained some samples of micro-radars, and they worked.

However, when he made then some that had the same schematic and they did not work. It turned out the there were manufacturing variations in the components that changed the compression ratio and consequently, the frequency 3162.

After much experimentation, he found that by adding DAC outputs 3110 and 3112 to generate the transmit signal 3210 and the receive signal 3220, and measuring the duty cycle of the transmit signal, he could control the compression ratio at the same time he controlled the duty cycle.

This also allowed a program to be executed on the sensor processor 3000 that could change the first DAC output 3110 until the duty cycle 3218 was within a factional range of the clock period 3117 of the sweep clock 3116. For instance, he found that if the ratio of the duty cycle to the clock period was 50%, the frequency 3162 of the IF signal 3160 was about 10 KHz, whereas if the ratio was about 70%, the frequency was about 6.3 KHz.

There is no immediate theory that seems to account for this phenomena, but experimentally it has been found to be true.

Further, field testing of the wireless sensor nodes 3310 has revealed that the compression ratio and therefore the frequency 3162 of the IF signal 3160 of these micro-radars 3100 are also sensitive to fluctuations in temperature 3125. However, it was again discovered that if the first DAC output 3110 was adjusted until the duty cycle estimate 3012 was again adjusted until it was in the vicinity of 70%, the frequency 3162 of the IF signal 3160 was again in the range of 6.3 KHz.

Before continuing the discussion of FIG. 1, the timing relationships involved with this micro-radar will be shown and discussed in FIGS. 2A-2C.

FIG. 2A shows a timing diagram of the relationship between the sweep clock 3116, the transmit signal 3210 and the reception signal 3220 as generated by the timing generator 3150 and used by the RFTM 3300, including the time delay 3300 between the signals and/or the pulses, the pulse widths and duty cycle 3218.

The transmit signal 3210 and the reception signal 3220 may be generated once in every cycle of the sweep clock 3116 by the timing generator 3150. The sweep clock has a clock period 3117, which in some situations is about 6.3 MHz.

The duty cycle 3218 of the transmit signal 3210 is the time in the clock period 3117 in which the signal is high, which is often referred to as logic '1'.

The transmit pulse 3212 is initiated in response to a first edge 3214 of the transmit signal 3210. Since the micro-radar 3100 circuitry is so much faster than the sensor processor 300 and the wireless sensor node 3300 in general, there are no delays shown between the first edge 3214 and the transmit pulse 3212 starting.

The reception pulse 3222 is initiated in response to a second edge 3224 of the reception signal 3220, again shown with no delays. However, there is a time delay 3300 between the first edge 3214 and the second edge 3224, which leads to essentially the same delay between the transmit pulse 3212 and the reception pulse 3222.

The transmit pulse width 3304 is shown as the active high width of the transmit pulse 3210. The reception pulse width 3302 is shown as the active high width of the reception pulse 3220. Both the transmit pulse with 3304 and the reception pulse width 3302 are about the same, and in some situations may be about 4 ns.

FIG. 2B shows a timing diagram sweep of the time delay 3300 from a short delay 3330 to a long delay 3332 over a time interval 3350, as well as the IF signal 3160 over the time interval with a peak amplitude 3164 at a sweep delay Tm corresponding to the distance T0 of the object 3020 from the antenna 3120 as shown in FIG. 1. The time interval may see the sweep start at the short delay and progress to the long delay as is shown. In other implementations, the time interval may see the opposite, that the sweep starts at the long delay progresses to the short delay.

Since the pulse widths 3302 and 3304 are essentially the same, for example, both about 4 ns, avoiding a collision between sending the antenna output 3122 and receiving the RF reflection 3124, can be served by setting the short delay 3330 to 4 ns. Setting the long delay 3332 to 20 ns after the short delay leads to setting the long delay to 24 ns, allowing for seep delays Tm that corresponding to traversing to and from the object at a distance roughly 10 feet, which is sufficient for many applications of the micro-radar 3100.

The IF signal 3160 is shown with a peak labeled a big bang 3352 before the start of the time interval 3350. The big bang is an occurrence where the sweep start 3038 is initiated earlier than shown in this Figure. In such a situation, the transmit RF burst 3132 and the reception pulse 3222 overlap in time, causing a false peak, irrespective of the received RF reflection 3152. In some situations, it may be preferred to operate the micro-radar 3100 so that the sweep start occurs after the big bang, not only saving power but also removing the need to remove the false peak from the detection of the sweep delay Tm.

The sensor processor 3000 shown in FIG. 1 may use an Analog to Digital Converter (ADC) 3020 less than 20 thousand times a second and yet determine the distance T0 very accurately, while being able to calibrate itself to account for variations in manufacturing, temperature 3125 and other ambient conditions.

The IF signal 3160 is also shown in FIG. 2B with a persisting trough occurring after the time interval 3350. This trough is labeled background noise 3354. By operating the micro-radar 3100 after the time interval, the IF signal may be sampled to create one or more ADC readings 3016 that may be used to generate a background noise estimate 3013 shown in FIG. 1. While the background noise has been shown as a persisting trough, it may take any of a wide variation in shapes and be encompassed in the scope of the claims. Background noise is noisy, but tends to be relatively small compared to the IF signal during the time interval, when received RF reflections 3152 increase the amplitude of the IF signal as shown in FIG. 2B. Detecting the object 3020 may also involve using a detect threshold 3011, which will be discussed later. The sensor processor 3000 may include the detect threshold, which may be generated from the background noise estimate 3013, shown first in FIG. 1 and further shown in FIG. 2B.

The micro-radar 3100 and/or the RFTM 3200 may be implemented as at least part of an integrated circuit 3102 and/or a printed circuit 3104. Through the use of the first DAC output 3110 and the second DAC output 3112, initial and later calibration of the micro-radar 3100, the integrated circuit 3102 and/or the printed circuit 3104 may be cost effectively performed, thereby minimizing production test costs and improving reliability in varying field conditions.

The micro-radar 3100 may be operated by the sensor processor 3000 through interactions with the DAC and an Analog to Digital Converter (ADC) 3020. The setting of the DAC outputs 3110 and 3112 have been described to some extent.

A duty cycle estimator 3170 may respond to the transmit signal 3210 to generate a duty cycle signal 3172 presented to an Analog to Digital Converter (ADC) to generate an ADC reading used to calculate a duty cycle estimate 3012.

The IF signal 3160 may be sampled by the ADC 3020 to create a possibly different ADC reading 3016 used to generate the IF sample 3014 at an estimated sweep delay Tm.

FIG. 1 shows one DAC 3010 generating both the first DAC output 3010 and the second DAC output 3112 and being coupled 3002 to the sensor processor 3000.

Various implementations of the DAC 3010 may be used to generate the first DAC output 3110 and/or the second DAC output 3112. These implementations of the DAC 3010 do not have to be the same, may differ in resolution and sampling rate. However, the discussion will proceed to illustrate one DAC generating both the first and second DAC outputs. This is not intended to limit the scope of the claims. It is done for the sake of simplifying the discussion. Also, the resolution of the DAC outputs 3110 and/or 3112 may be at least 10 bits, and in some situations may be preferred to be more than 10 bits.

The coupling 3002 between the sensor processor 3000 and the DAC 3010 today is preferably a wireline coupling, frequently involving one or more electrically conductive materials. However other implementations may be preferred. For example, the coupling may also implement an optical coupling which might not be electrically conductive.

FIG. 1 also shows the sensor processor 3000 second coupled 3004 to an Analog to Digital Converter (ADC) 3020. The sensor processor and/or the wireless sensor node 3300 and/or the wireline sensor node 3310 may be adapted and/or configured to use the ADC 3120 in one or more of the following ways:

The ADC 3020 may respond to the duty cycle signal 3212 and the interactions of the sensor processor 3000 through the second coupling 3004 to generate a duty cycle estimate 3012 in the sensor processor, and/or The ADC 3020 respond to the IF signal 3160 and the interactions of the sensor processor 3000 through the second coupling 3004 to generate an IF sample 3014 in the sensor processor.

Various implementations of the ADC 3020 may be used to generate the duty cycle estimate 3012 and/or the IF sample 3014. These implementations of the ADC 3020 do not have to be the same, may differ in resolution and sampling rate. However, the discussion will proceed to illustrate one ADC generating both the duty cycle estimate 3012 and the IF sample 3014. This is not intended to limit the scope of the claims. It is done for the sake of simplifying the discussion. Also, the resolution of the ADC 3020 may be at least 10 bits, and in some situations may be preferred to be more than 10 bits.

The second coupling 3004 between the sensor processor 3000 and the ADC 3020 today is preferably a wireline coupling, frequently involving one or more electrically conductive materials. However other implementations may be preferred. For example, the second coupling may also implement an optical coupling which might not be electrically conductive.

The interactions across the second coupling 3004 may include a selection of an analog input port and a strobing of the ADC 3020 to provide data to be used as the duty cycle estimate 3012 and/or the IF sample 3014.

The micro-radar 3100 may include a first ADC coupling 3106 of the IF signal 3160 to the ADC 3160, and/or a second ADC coupling 3108 of the duty cycle signal 3212 to the ADC 3160.

In some embodiments, the sensor processor 3000 may include the DAC 3010 and/or include the ADC 3020. Whereas in other embodiments, the sensor processor, the DAC and the ADC may be separate components fastened to a printed circuit 3104, possibly containing all or part of the micro-radar 3100, and the first coupling 3002 and the second coupling 3004 may be electrical traces on and/or through the printed circuit.

Figure 3:
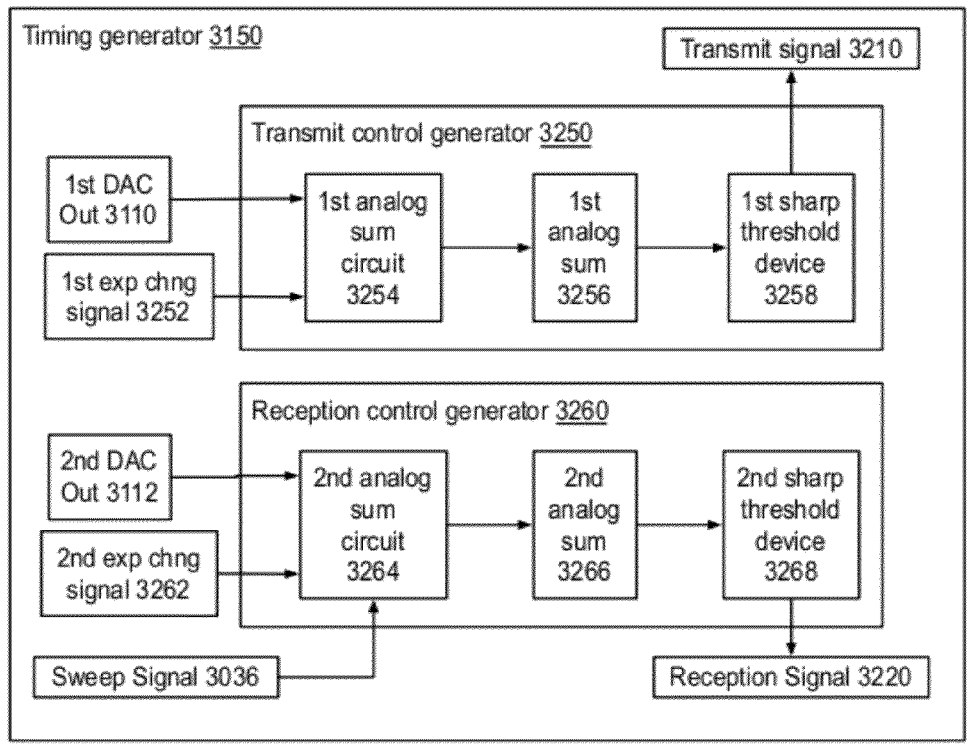
FIG. 3 shows some details the micro-radar, in particular the timing generator of FIG. 1, including a transmit control generator responding to the first DAC output and a reception control generator responding to the second DAC output.

FIG. 3 shows some details the micro-radar 3100, in particular the timing generator 3150 of FIG. 1, including a transmit control generator 3250 responding to the first DAC output 3110 and a reception control generator 3260 responding to the second DAC output 3112.

The transmit control generator 3250 may include a first analog sum 3256 of a first exponentially changing signal 3252 and the first DAC output 3110 triggering a first sharp threshold device 3258 to generate the transmit signal 3210 with a duty cycle 3218 as shown in FIG. 2A. The transmit signal may stimulate the duty cycle estimator 3170 to generate the duty cycle signal 3172 as shown in FIG. 1. Note that the first analog sum may be generated by a first analog sum circuit 3256.

The reception control generator 3260 may includes a second analog sum 3266 of the second DAC output 3112, a second exponentially changing signal 3262 and the sweep clock signal 3116 triggering a second sharp threshold device 3268 to generate the reception signal 3220. The second analog sum may be generated by a second analog sum circuit 3266.

The first and second analog sum circuits 3254 and 3264 may be implemented in a wide variety of ways, including through the use of differential amplifiers and/or weighted resistor networks designed based upon Ohm's Law to generate the analog sum 3256 and/or 3266.

The first exponentially changing signal 3252 is used to generate the transmit signal 3210, and will tend to need a fast time of change, possibly changing from a saturation to depleted state in a few nanoseconds.

The second exponentially changing signal 3262 is used to generate the time delay 3300 sweep from a short delay 3330 to a long delay 3332 over the time interval 3350, which may be on the order of 20 ms.

Circuitry to generate the first exponentially changing signal 3252 and/or the second exponentially changing signal 2166 may be implemented based upon capacitor charging and/or discharging across a resistor, which may be further implemented with various components of one or more transistors acting as the capacitor and/or the resistor.

In some embodiments, the exponentially changing signals 3252 and/or 3262 may be generated through piecewise linear behavior of threshold switching components. Such signals may not change in an exactly exponential fashion, but will display a distinctive change in the rate of change which will be monotonically increasing or monotonically decreasing within one sweep clock 3116 period 3117.

The first exponentially changing signal 3252 may have an RC delay of 20 ns. The second exponentially changing signal 3262 may have an RC decay of 20 ms. The delay sweep shown in FIG. 2B may be controlled by a signal set by the sensor processor 3000 that may short the capacitor that generates the second exponentially changing signal.

The transmit pulse 3212 use only the high speed RC signal and the reception pulse 3222 may use both the reception signal 3220 and the transmit signal 32210.

Figure 4:
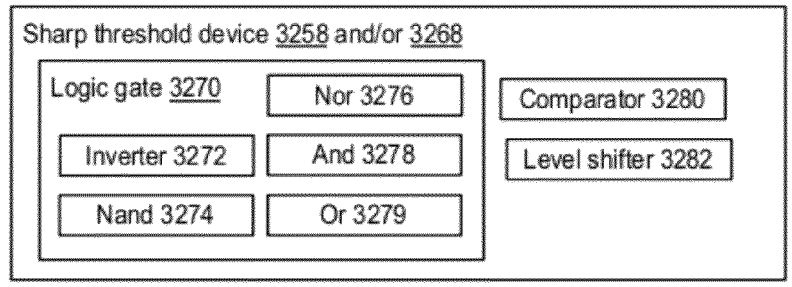
FIG. 4 shows the first sharp threshold device and/or the second sharp threshold device of FIG. 3 may include at least one instance of a logic gate, a comparator and/or a level shifter.

FIG. 4 shows the first sharp threshold device 3258 and/or the second sharp threshold device 3268 may include at least one instance of a logic gate 3270, a comparator 3280 and/or a level shifter 3282. The logic gate 3272 which may be implemented as an inverter 3272, a NAND gate 3274, a NOR gate 3276, an AND gate 3278, and/or an OR gate 3279. In situations where the logic gate has more than one input, the analog sum 3256 or 3266 may be supplied to one or more of the inputs. Any remaining inputs may be tied to logic 1 or 0 as needed.

The simplicity of using basic power logic gates 3270 instead of more power consuming comparators 3280 is very desirable but adds to the need to calibrate out the part to part voltage threshold differences found in these gates. Threshold variations may cause two major issues in the design: the IF signal 3160 frequency 3162 may vary based on the part of the RC curve that is used as the switching point, and the time delay 3300 of the transmit pulse 3212 versus the reception pulse 3222 may create uncertainty in the detection distance tO versus sweep delay Tm relationship.

To address these situations, a method of calibrating the micro-radar 3100 that can adjust for both of these uncertainties and compensate them over temperature 3125 without a lot of power consumption or specially calibrated parts was developed. This method will be described later in FIG. 10 in terms of a program system 3500 that may instruct a computer 3852.

Figure 5:
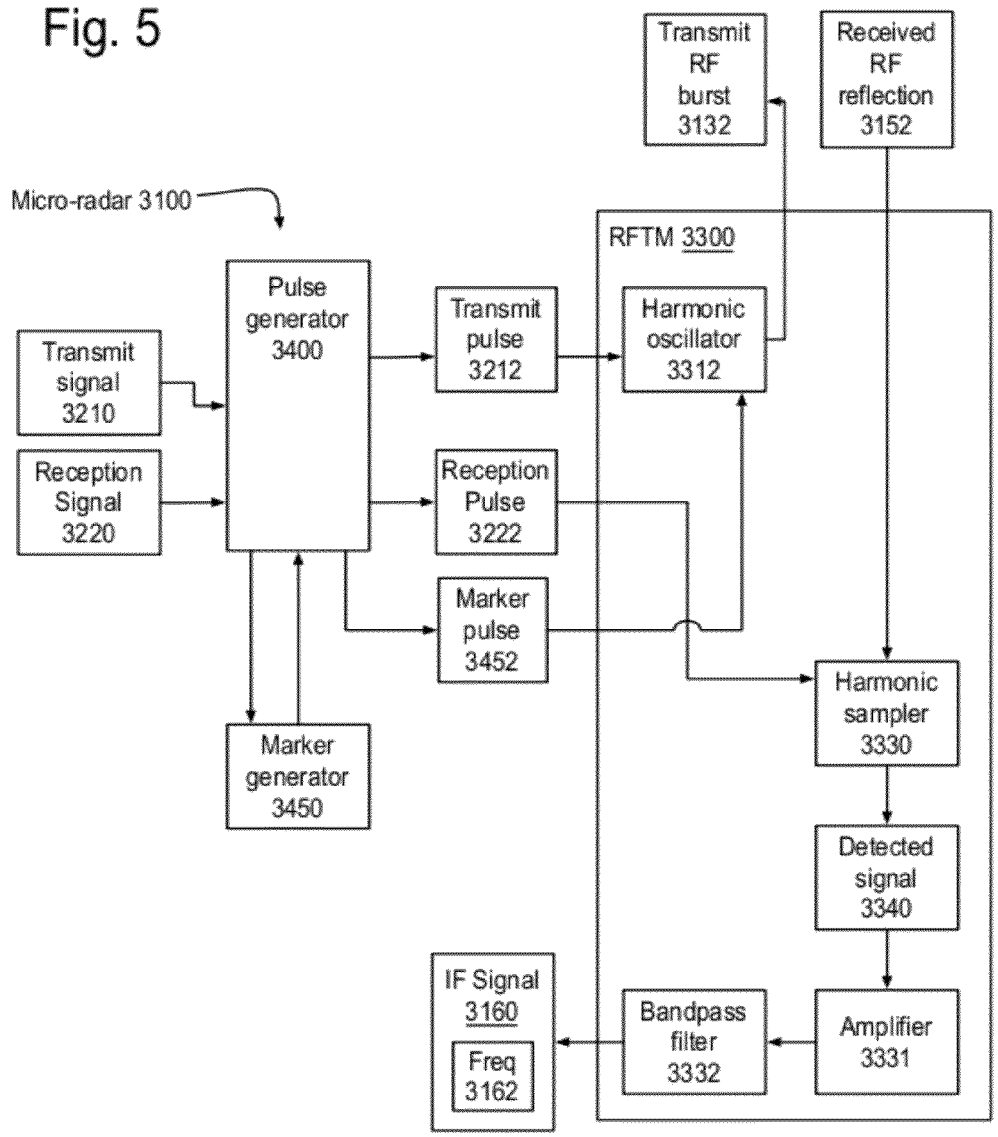
FIG. 5 shows an example of the RFTM of FIG. 1 based upon the circuitry of U.S. Pat. No. 6,414,627 (hereafter referred to as the '627 patent).

FIG. 5 shows an example of the RFTM 3300 of FIG. 1 based upon the circuitry of U.S. Pat. No. 6,414,627 (hereafter referred to as the '627 patent). In this example, the carrier frequency 3123 of antenna output 3122 is 24 GHz. A single antenna 3120 is used as shown in FIG. 1. The RFTM emits 24 GHz RF sinewave packets and samples echoes with strobed timing such that the illusion of wave propagation at the speed of sound is observed, thereby forming an ultrasound mimicking radar (UMR). A 12 GHz frequency-doubled transmit oscillator in the RFTM is pulsed by the transmit pulse 3212 a first time to transmit a 24 GHz harmonic burst as the transmit RF burst 3132 and pulsed by the reception pulse 3222 a second time to produce a 12 GHz local oscillator burst for a sub-harmonically pumped, coherently integrating sample-hold receiver (homodyne operation). The time between the first and second oscillator bursts is swept as shown in FIG. 2B to form an expanded-time replica of echo bursts at the receiver output as the IF signal 3160.

A random phase RF marker pulse may be interleaved with the coherent phase transmitted RF antenna output 3122 to aid in spectrum assessment of the micro-radar's 3100 nearly undetectable emissions. The low-cost micro-radar 3100 can be used for automotive backup and collision warning, precision radar rangefinding for fluid level sensing and robotics, precision radiolocation, wideband communications, and time-resolved holographic imaging.

The RFTM 3300 may be implemented as a transmit oscillator and as a swept-in-time pulsed receive local oscillator. This dual function use of one oscillator eliminates the need for two microwave oscillators and facilitates operation with only one antenna for both transmit and receive functions. Further, it assures optimal operation since there are no longer two oscillators that can go out of tune with each other (in a two oscillator system, both oscillators must be tuned to the same frequency).

The transmit RF burst 3132 may be short, perhaps on the order of a few nanoseconds and sinusoidal, is transmitted to as the antenna output 3122 and reflected as the RF reflection 3124 from the object 3020. Shortly after transmission, the same RF oscillator used to generate the transmit pulse is re-triggered to produce a local oscillator pulse (homodyne operation) as the reception pulse, which gates a sample-hold circuit in to produce a voltage sample. This process may be repeated at a several megaHertz rate as controlled by the sweep clock 3116. With each successive repetition, another sample may be taken and integrated with the previous sample to reduce the noise level. Also, each successive local oscillator pulse is delayed slightly from the previous pulse such that after about the time interval 3350, the successive delay increments add up to a complete sweep or scan from the short delay 3330 to the long delay 3332, for example, of perhaps 100-nanoseconds or about 15 meters in range. After each scan, the local oscillator delay is reset to a minimum and the next scan cycle begins.

The micro-radar 3100 produces a sampled voltage waveform on a millisecond scale that is a near replica of the RF waveform on a nanosecond scale. This equivalent time effect is effectively a dimensionless time expansion factor. If the compression ratio is set to 1-million, 24 GHz sinewaves are output from the micro-radar as 24 kHz sinewaves. Accordingly, the radar output can be made to appear like an ultrasonic ranging system. In addition to having the same frequency, e.g., 24 kHz, a 24 GHz radar actually has the same wavelength as a 24 kHz ultrasonic system. In addition, the range vs. round-trip time is the same (in equivalent time for the radar, of course).

The emission spectrum from the RFTM 3300 is very broad and often implemented as an Ultra Wide-Band (UWB) compliant signal generator. Sometimes, a narrowband, incoherent RF marker pulse may interleaved with the short coherent RF pulses used for ranging to produce a very visible spectrum with an identifiable peak, i.e., carrier frequency 3123. However, the marker pulse may create spurious echoes. Accordingly, the marker pulse may be randomized in phase so its echoes average to zero in the RFTM. At the same time, the desired ranging pulses as the antenna output 3122 and the RF reflection 3124 phase-coherently integrating from pulse to pulse into a clean IF signal 3160.

FIG. 5 shows some details of the micro-radar 3100 and the RFTM 3300 of FIG. 1 adapted to operate as in the '627 patent. A harmonic oscillator 3312 receives the transmit pulse 3212 from the transmit signal 3210 via pulse generator 3400 and produces RF burst pulses as the transmit RF burst at the antenna 3120 as shown in FIG. 1.

In some implementations the transmit signal 3210 may be a 1-10 MHz square wave that is passed through pulse generator to form about 1 ns wide transmit pulses 3212 with rise and fall times on the order of 100 picoseconds (ps). The transmit pulse 3212 and the reception pulse 3222 may be clock pulses with very fast rise and fall times. The transmit pulse 3212 and pulse generator 3400 may together be viewed as a clock signal generator. These short pulses bias-on the harmonic oscillator 3312, which is designed to start and stop oscillating very rapidly as a function of applied bias. The oscillations of the transmit pulses 3212 are phase coherent with the drive pulses, the phase of the RF sinusoids of the transmit RF burst 3132 relative to the drive pulse remains constant, i.e., coherent, each time the harmonic oscillator 3312 is started—there is little clock-to-RF jitter. However, as will be discussed below with reference to the marker generator 3450, separate marker pulses M may have a random phase relative to the clock.

A high degree of phase coherence for the transmit pulse 3212 may be obtained with a very fast risetime transmit signal 3210 that shock-excites the harmonic oscillator 3312 into oscillation. Accordingly, the pulse generator 3400 may have transition times of about 100 ps to ensure coherent harmonic oscillator startup.

The harmonic oscillator 3312 may operate at a fundamental frequency of 12.05 GHz with a second harmonic at 24.1 GHz. A frequency of 24.1 GHz or thereabouts may be preferred since commercial and consumer devices such as radar rangefinders can operate in the 24.0-24.25 GHz band without a license. The transmitted RF bursts 3132 may be typically 12 cycles long at a carrier frequency 3123 of 24.1 GHz The reception signal 3220 may be a 1-10 MHz square wave passed through pulse generator 3400 to form the reception pulse 3222 as about 1 ns wide pulses with rise and fall times below 100 ps. These short pulses bias-on the harmonic oscillator 3312 to generate the reception pulse 3222 in a similar fashion to the transmit pulses 3212 to form the reception pulses as 0.5 ns wide gate pulses. The reception pulses 3222 gate the harmonic sampler 3330 at typical frequency of 12 GHz to sample the received RF reflection 3152.

The harmonic sampler 30 develops a detected signal 3332, representing the coherent integration of multiple gatings of sampler 30, which is amplified by a low frequency amplifier 3331 and filtered in bandpass filter 3332 to produce the IF signal 3160 signal.

The micro-radar 3100 may include a marker generator 3450. The marker generator may be triggered by pulses from the pulse generator 3400 to form marker pulses 3452 which are much wider than the transmit pulse 3212 or the reception pulse 3222. Due to the width of the marker pulses 3452, the radiated spectrum becomes relatively narrow, since the emission spectrum is roughly related by 1/PW, where PW is the width of the emitted pulses. One purpose of the narrow marker pulse spectrum is to aid in identifying the RF carrier frequency 3123 and spectral width of the transmitted pulses 3212 and/or the transmit RF burst 3132.

Note that in some implementations, the amplifier 3331 and the bandpass filter 3332 may be implemented by a single component. Such a component may be a fixed gain (possibly about 45 dB) 6 pole bandpass amplifier centered at 6.5 kHz with a bandwidth of approximately 24 kHz. In other implementations, fewer gain stages may be used with the filtering reduced to say 4 poles.

Figure 6:
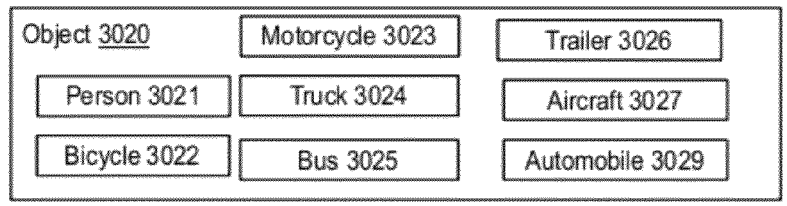
FIG. 6 shows some examples of the object as at least one of a person, a bicycle, a motorcycle, an automobile, a truck, a bus, a trailer and/or an aircraft.

FIG. 6 shows some examples of the object 3020 as at least one of a person 3021, a bicycle 3022, a motorcycle 3023, an automobile 3029, a truck 3024, a bus 3025, a trailer 3026 and/or an aircraft 3027.

Figure 7:
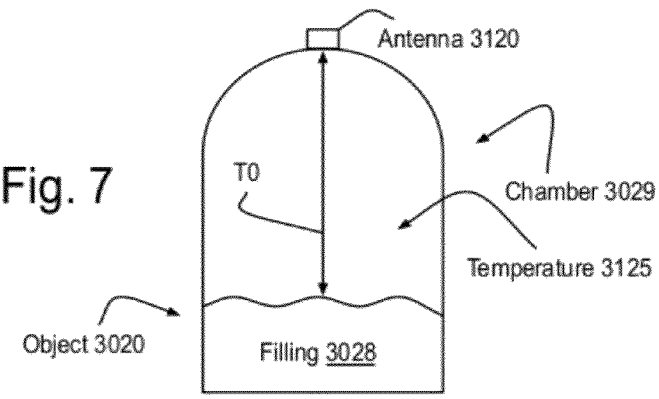
FIG. 7 shows some examples of the object as a surface of a filling of a chamber.

FIG. 7 shows some examples of the object 3020 as a surface of a filling 3028 of a chamber 3029, where the filling may be a liquid and/or granules such as grain, powders and/or sand. The chamber may be used for storeage and/or mixing of components which may be considered as the filling in some implementations.

Figure 8:
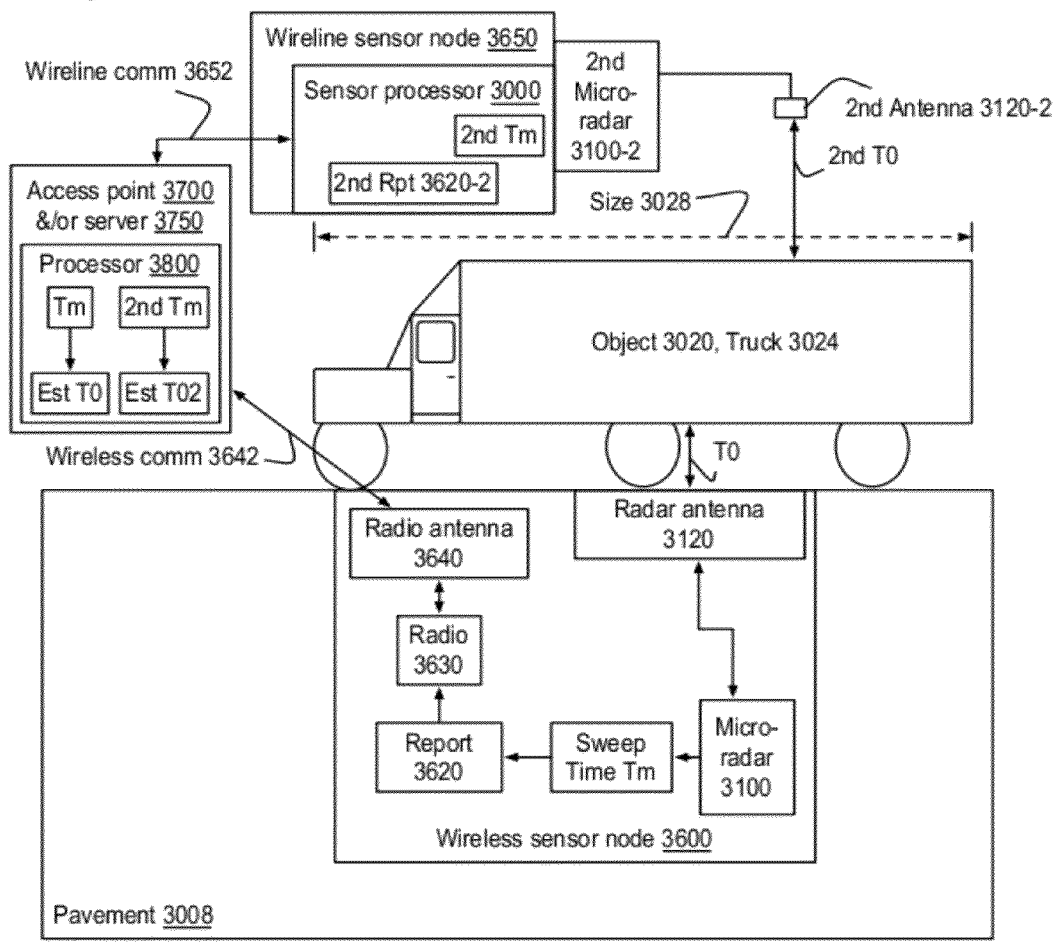
FIG. 8 shows some other apparatus embodiments that involve the micro-radar of FIG. 1, including but not limited to, the wireless sensor node and the wireline sensor node, sending report based upon the estimate sweep delay. A processor may respond to the reports to generate an estimated distance approximating the distance T0 of the radar antenna from the object. Access points and/or servers may include the processor and/or share communications between the sensor nodes and/or the micro-radars and/or the processors.

FIG. 8 shows some other apparatus embodiments that involve the micro-radar 3100 of FIG. 1, including but not limited to, the wireless sensor node 3600, the wireline sensor node 3650, each of which may send reports 3620 and/or 3620-2 regarding the sweep delay Tm sampled by their respective micro-radar 3100 to an access point 3700 and/or a server 3750. A processor 3800, which may be separate from, or included in the access point and/or the server may respond to one or both reports to generate an estimated distance approximating the distance T0 of the relevant radar antenna 3120 or 3120-2 from the object 3020, in this example, a truck 3024.

The wireless sensor node 3600 may include a radio 3630 coupled to a radio antenna 3640 to wirelessly communicate 3642 the report 3620 to the access point 3700. As shown in this Figure, the processor 3800 may be included in the access point and configured to use the report 3620 to create the sweep delay Tm, local to the access point and/or the processor. The processor may further be configured to respond to the sweep delay Tm by generating an estimated TO distance of the radar antenna to the object 3020. The radio antenna 3640 and the radar antenna 3120 may be located near the top of the wireless sensor node 3600, which may be embedded in the pavement 3008.

The wireline sensor node 3650 may not include the second micro-radar 3100-2, but may communicate with it in a fashion similar to that described with regards FIG. 1. The second antenna 3120-2 may or may not be located close to the micro-radar. The wireline sensor node may operate the second micro-radar to generate a second sweep delay Tm corresponding to a second distance T0 of the second antenna from the object 3020. The wireline sensor node may wireline communicate 3652 with the server 3750 and/or the access point 3700. The processor 3800 may be included in the server and may be configured to respond to reception of the second report by generating the second sweep delay Tm. The processor may further respond by generating a second distance estimate T02 based upon the second sweep delay Tm.

Figure 9:
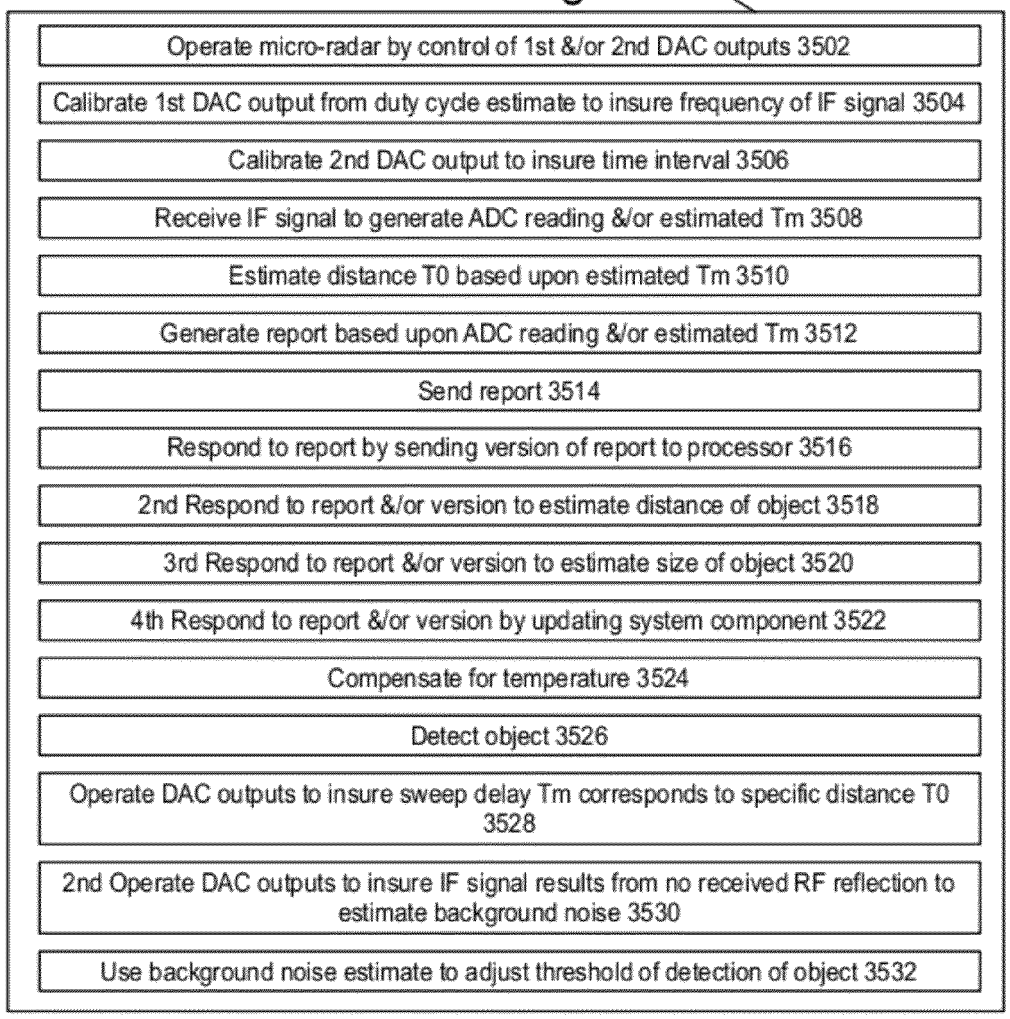
FIG. 9 shows some details of at least one of the sensor processor and/or the processor of FIG. 8 may be individually and/or collectively may be implemented as one or more instances of a processor-unit that may include a finite state machine, a computer, a program system, an inferential engine and/or a neural network. The apparatus may further include examples of a delivery mechanism, which may include a computer readable memory, a disk drive and/or a server, each configured to deliver the program system and/or an installation package to the processor-unit to implement at least part of the disclosed method and/or apparatus.

FIG. 9 shows some details of at least one of the sensor processor 3000 and/or the processor 3800 may be individually and/or collectively may be implemented as one or more instances of a processor-unit 3820 that may include a finite state machine 3850, a computer 3852 coupled 3856 to a memory 3854 containing a program system 2300, an inferential engine 3858 and/or a neural network 3860. The apparatus may further include examples of a delivery mechanism 3830, which may include a computer readable memory 3822, a disk drive 3824 and/or a server 3826, each configured to deliver 3828 the second program system 2300 and/or an installation package 3809 to the processor-unit 3820 to implement at least part of the disclosed method and/or third apparatus. These delivery mechanisms 3830 may be controlled by an entity 3820 directing and/or benefiting from the delivery 3828 to the processor-unit 3820, irrespective of where the server 3826 may be located, or the computer readable memory 3822 or disk drive 3824 was written.

- As used herein, the Finite State Machine (FSM) 3850 receives at least one input signal, maintains at least one state and generates at least one output signal based upon the value of at least one of the input signals and/or at least one of the states.
- As used herein, the computer 3852 includes at least one instruction processor and at least one data processor with each of the data processors instructed by at least one of the instruction processors. At least one of the instruction processors responds to the program steps of the second program system 2300 residing in the memory 3854.
- As used herein, the Inferential Engine 3858 includes at least one inferential rule and maintains at least one fact based upon at least one inference derived from at least one of the inference rules and factual stimulus and generates at least one output based upon the facts.
- As used herein, the neural network 3860 maintains at list of synapses, each with at least one synaptic state and a list of neural connections between the synapses. The neural network 3860 may respond to stimulus of one or more of the synapses by transfers through the neural connections that in turn may alter the synaptic states of some of the synapses.

FIG. 10 shows a flowchart of the program system 3500 of FIG. 8 including at least one of the shown program steps.

Program step 3502 supports operating the micro-radar 3100 by control of the first DAC output 3110 and/or the second DAC output 3112.

Program step 3504 supports calibrating the first DAC output 3110 based upon the duty cycle estimate 3012 to insure the frequency 3162 of the IF signal 3160. Note that this program step may be used to help calibrate the second DAC output 3112, by measuring the duty cycle of the reception signal 3220 with another ADC 3020 input. This program step may by executed every so often, possibly every few seconds or minutes, to compensate for temperature 3125 or other ambient condition changes.

Program step 3506 supports calibrating the second DAC output 3112 to insure the time interval 3350 sweeps between the short delay 3330 and the long delay 3332.

Program step 3508 supports receiving the IF Signal 3106 to generate one or more ADC readings 3016 and/or an estimated sweep delay Tm for the object 3020.

Program step 3510 supports estimating the distance based upon the estimated sweep delay Tm to generate the estimated distance T0 as shown in FIG. 8.

Program step 3510 may be executed by a computer in any of the sensor nodes 3600 and/or 3650, the processor 3800, the access point 3700, and/or the server 3750. However, another approach may be to generate 3512 and send 3514 at least one report 3620 as shown in FIG. 8, which is then used as the basis of response for a system.

Program step 3512 supports generating the report 3620 based upon the one or more ADC readings 3016 and/or the estimate sweep delay Tm.

Program step 3514 supports sending the report 3620, which in various embodiments may be targeted for the access point 3700, the server 3750 and/or the processor 3800. The report may be sent from the wireless sensor node 3600 and/or from the write sensor node 3650. Depending upon the communications technology employed in the sending, the report 3620 may be implemented as one or more packets, frames or encoded in a data stream.

Program step 3516 supports responding to the report 3620 by sending a version of the report to the processor 3800.

Program step 3518 supports a second responding to the report 3620 and/or a version of the report to estimate the distance T0 of the object 3620.

Program step 3520 supports a third responding to the report 3620 and/or a version of the report to estimate the size 3028 of the object 3020, which may be the length of a truck 3024 in some embodiments.

Note that the report 3620 and/or one of the versions of the report may include the distance estimate T0 and/or the size estimate 3028 of the object 3020 in some embodiments.

Program step 3522 supports a fourth responding to the report 3620 and/or a version of the report by updating a system and/or system component. Consider for the moment the systems and/or components shown in FIG. 11.

Any of the processor 3800, the access point 3700, and/or the server 3750 may be updated.

In some embodiments, the wireless sensor node 3600 and/or the wireline sensor node 3650 and/or one of the sensor processors 3000 may be updated.

Also, a traffic monitoring system 3900, a traffic control system 3902, a parking management system 3904 and/or a production management system 3906 may be updated.

Returning to FIG. 10, program step 3524 supports compensating for the temperature 3125 shown in FIG. 1 in operating the micro-radar 3100, often by altering the first DAC output 3110 and/or the second DAC output 3112. This supports what the inventor has experimentally found to be the operational reality of the components of the micro-radar, as opposed to the temperature immunity of the antenna output 3122 and the RF reflection 3124 reported by the prior art.

The duty cycle estimate 3012 may be based upon measuring the output of the sharp threshold device 3258 and/or 3268 (for example as a comparator 3280) corresponds directly to the operating point of the RC curve. That means that adjusting the duty cycle higher, moves the operating range of the comparator to a lower (faster moving) part of the RC curve which in turn reduces the IF frequency 3162. It was found out experimentally that operating at a 70% duty cycle corresponds to approximately a 6.5 KHz IF frequency. The first step in the calibration process then is to adjust the DACs 3010 to measure a 70% duty cycle on the output.

The temperature 3125 may affect the IF signal 3160 in a couple of ways. First, the threshold offsets of the sharp threshold devices 3258 and 3268 may vary with temperature causing a time shift between the transmit pulse 3212 and the reception pulse 3222. Second, the noise of the IF signal 3160 may increase as the temperature 3125 increases.

The time shift variation between the transmit pulse 3212 and the reception pulse 3222 may be eliminated by occasionally performing calibration radar sweeps supported by program step 3506, which sample the leading edge of the big bang using the second DAC output 3112 measured during calibration. A feedback loop is implemented in firmware to adjust the DAC such that the leading edge of the big bang is fixed to the same value it had during calibration. The DAC offset from its calibrated value is then filtered (to smooth operation) and applied to the DAC value used during normal operation of the micro-radar 3100.

Eliminating the noise in the IF signal 3160 may not be practical. However, the influence of the extra noise may be used during detection to adjust a detection threshold 3011. While noise increases with increased temperature 3125, the radar return signal, or RF reflection 3124 does not.

In certain situations, adjusting DAC 3010 thresholds to temperature 3125 may improve sensitivity at low temperatures, which may not be the desired effect.

Also, as temperatures 3125 lower the micro-radar 3100 might uncover return signals that do not scale with temperature.

A method for measuring the background noise would allow its effects to be corrected. One method may be to measure temperature 3125 and apply a log scale factor that is linear if noise is measured in decibels (dB).

In order to reduce the power consumption of the micro-radar 3100, the sensor processor only needs to listen for the RF reflection 3124 after the initial Rx/Tx overlapping period, called the big bang.

Adjusting the second DAC output 3112 may advance or delay the reception signal 3220 when compared to the transmit signal 3210. Experimentally it was determined that there is a near linear relationship between the offset time DAC setting and that the leading edge of the big bang. The leading edge of the big bang may act as a useful timing reference, because it is not influenced by the RF reflections 3124 of the micro-radar 3100. Measuring the leading location of the big bang 3352 at two different duty cycles 3012 can support computing the second DAC output 3112 that will set the big bang before the start of the time interval 3350 of the time interval 3300 as shown in FIG. 2B.

The calibration steps 3504 and 3506 create an initial setting of the first DAC output 3110 for the transmit pulse 3212 and the second DAC output 3112 for reception pulse 3222 for use in normal operation and a second setting of the second DAC output that corresponds to setting the leading edge of the big bang at a fixed time location (currently 64 samples). This last value may be used by the temperature compensation algorithm denoted as program step 3524.

The input to the detection algorithm 3526 may be 512 samples at 40 micro-seconds per sample for a total time of 20.48 milliseconds.

In order to improve the signal to noise ratio (SNR) for the detection step 3526, sampling the IF signal 3160 may be divided into time segments, each 32 samples long. It was experimentally found that better results could be obtained if the segments overlap by 16 samples. This leads to one complete scan being split into 31 bins of 32 samples each. The energy of the IF signal in each bin is then computed by first subtracting the average (DC) component of the IF signal and then computing the sum of the squares of the samples. A single average is computed for all bins, based on that part of the sweep that is past the influence of the big bang. In some modes of operation of the sensor processor 3000 may present the value of each bin in dB for test and debugging purposes. For detection 3526, a separate baseline may be computed for each bin. A threshold may then computed based on this baseline.

For motion detection 3526 of the object 3020, often 32 non-overlapping 32 sample bins may be used. Motion is detected by subtracting the raw samples of one radar sweep from a previous sweep. This has a couple of nice features: the average value of the difference is zero so that average need not be computed or subtracted before energy is computed, and the big bang signal present in the data is also subtracted so that the sensitivity is constant across the sweep. For motion detection the detection threshold 3011 may be used for all bins.

Program step 3528 supports operating the first DAC output 3110 and the second DAC output 3112 to insure that the sweep delay Tm corresponds to a specific distance T0.

Program step 3530 supports second operating the first DAC output 3110 and the second DAC output 3112 to insure the IF signal 3160 results from no received RF reflection 3124, so that the IF signal results from the background noise 3354 as shown in FIG. 2B to create the background noise estimate 3013 shown in FIG. 1.

Program step 3532 supports using the background noise estimate 3013 to adjust the detect threshold 3011 shown in FIG. 1. The detect threshold is then used in program step 3526 to detect the object 3020, particularly when it is moving as discussed above.

Figure 11:
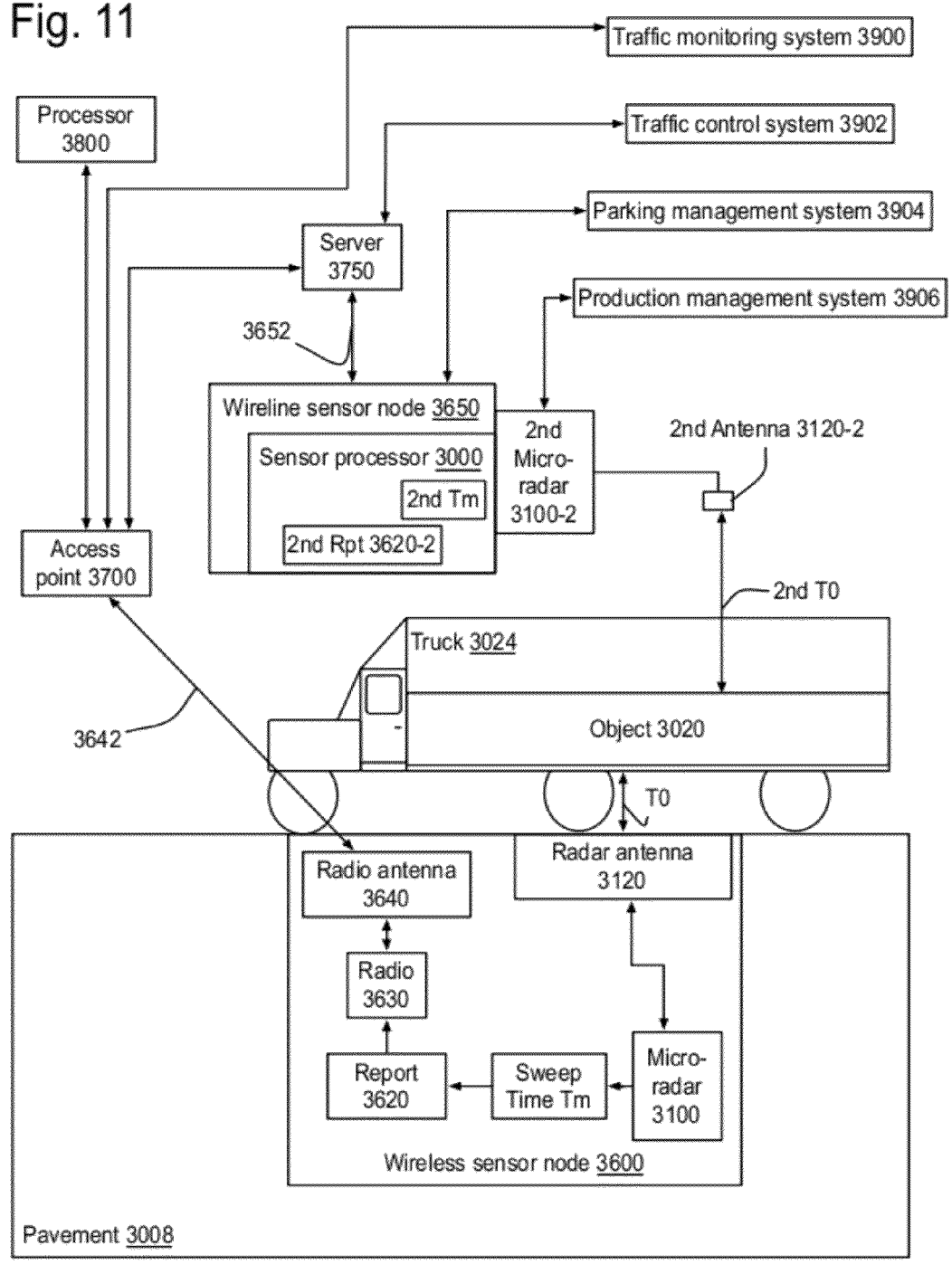
FIG. 11 shows a simplified network diagram of various systems that may communicate with the micro-radars and/or the wireless sensor node and/or the wireline sensor node and/or the processor and/or the access point and/or the server of FIG. 8. The various systems include but are not limited to a traffic monitoring system, a traffic control system, a parking management system and/or a production management system.

FIG. 11 shows a simplified network diagram of various systems that may include one or more communicative couplings 3642 and/or 3652 to the micro-radar 3100 and/or 3100-2 and/or the wireless sensor node 3600 and/or the wireline sensor node 3650 and/or the processor 3800 and/or the access point 3700 and/or the server 3750. The various systems include but are not limited to a traffic monitoring system 3900, a traffic control system 3902, a parking management system 3904 and/or a production management system 3906. Note that the second micro-radar 3100-2 may be used to estimate the distance T0 to the object 3020, which may be the surface of a filling 3028 in a chamber of the truck 3024, to determine how full it is of grapes or oranges, for example.

The preceding discussion serves to provide examples of the embodiments and is not meant to constrain the scope of the following claims.

The invention claimed is:

1. An apparatus, comprising:
a micro-radar adapted to generate an antenna output of less than or equal to 10 milli-Watt (mW) through an antenna to an object and receive a Radio Frequency (RF) reflection off of said object, and adapted to respond to a first Digital to Analog Converter (DAC) output and a second DAC output, comprising:
a timing generator adapted to generate a transmit signal with a first edge in response to said first DAC output and a system clock; and
said timing generator adapted to generate a reception signal with a second edge in response to said second DAC and said system clock, where said second edge has a delay from said first edge that sweeps through a short delay to a long delay over a time interval;
said micro-radar generates a transmit RF burst in response to said first edge of said transmit signal for delivery to said antenna to generate said antenna output in response to said transmit pulse;
said micro-radar mixes a received RF reflection of said RF reflection and said transmit RF burst, in response to said second edge of said reception signal, to generate an Intermediate Frequency (IF) signal with a peak amplitude at a sweep delay Tm for a distance T0 of said object from said antenna; and
a frequency of said IF signal is one over a compression ratio multiplied by a carrier frequency of said antenna output, where said compression ratio is about one million.

2. The apparatus of claim 1, wherein said timing generator, comprises at least one of:
a transmit control generator adapted to receive said first DAC output and a first exponentially changing signal to generate a duty cycle of said transmit signal to stimulate a duty cycle estimator to generate said duty cycle signal; and/or
a reception control generator adapted to receive said second DAC output, a second exponentially changing signal and a clock signal to generate said reception signal.

3. The apparatus of claim 2, wherein said micro-radar further comprises at least one of:
a first Analog to Digital Converter (ADC) coupling of said IF signal to generate an IF sample approximating said peak amplitude at said sweep delay; and/or
a second Analog to Digital Converter (ADC) coupling of a duty cycle signal based upon said transmit signal to generate a duty cycle estimate that indicates said compression ratio.

4. The apparatus of claim 2, wherein said transmit control generator comprises a first analog sum of said first exponentially changing signal and said first DAC output to generate a first analog signal triggering a first sharp threshold device to generate said transmit signal with said duty cycle; and/or
said reception control generator comprises a second analog sum of said second DAC output, said second exponentially changing signal and said clock signal to generate a second analog signal triggering a second sharp threshold device to generate said reception signal.

5. The apparatus of claim 4, wherein at least one of said first sharp threshold device and said second sharp threshold device includes a logic gate and/or a comparator and/or a level shifter.

6. The apparatus of claim 1, wherein said compression ratio is one million to within twenty percent.

7. The apparatus of claim 1, wherein said micro-radar is implemented as an integrated circuit.

8. The apparatus of claim 1, wherein said object includes at least one of a person, a bicycle, a motorcycle, an automobile, a truck, a bus, a trailer and an aircraft.

9. The apparatus of claim 1, wherein said object is a surface of a filling of a chamber.

10. The apparatus of claim 1, further comprising at least one of:
a wireless sensor node and/or a wireline sensor node, each configured to operate an instance of said micro-radar to send a report regarding said sweep delay for said object; and/or
a processor configured to receive and to respond to said report by generating an estimate of said distance of said object from said micro-radar; and/or
an access point configured to wirelessly communicate with said micro-radar via said radio transceiver to send a version said report to said processor; and/or
a server configured to communicate said version of said report from said micro-radar to said processor.

11. The apparatus of claim 10, wherein said wireless sensor node and/or said wireline sensor node further comprises a sensor processor configured to operate said micro-radar by control of said first DAC output and said second DAC output.

12. The apparatus of claim 11, wherein at least one of said processor, said access point, said server and/or said sensor processor includes at least one instance of at least one of a finite state machine and a computer accessibly coupled to a memory containing a program system comprised of program steps configured to instruct said computer.

13. The apparatus of claim 12, wherein said program system comprises at least one of the program steps of:
- operating said micro-radar based upon control of said first DAC output and/or said second DAC output to control said compression ratio and said IF signal;
- receiving an ADC reading based upon said IF signal and/or said sweep delay for said object;
- generating said report based upon said ADC reading and/or said sweep delay;
- responding to said report by sending said version of said report to said processor;
- second responding to said report and/or said version to generate said distance of said object from said micro-radar;
- third responding to said distance of said object from said micro-radar by updating at least one of a traffic monitoring system, a traffic control system, a parking management system, and/or a production management system;
- second operating said micro-radar based upon said first DAC output and/or said second DAC output to insure said sweep delay Tm corresponds to a specific distance T0 of said object;
- third operating said micro-radar based upon said first DAC output and/or said second DAC output to generate said IF signal dominated by a background noise to create a background noise estimate;
- using said background noise estimate to adjust a detect threshold of said object; and/or
- detecting said object based upon said ADC reading and said detect threshold.

14. The apparatus of claim 13, wherein the program step of operating said micro-radar further comprises at least one of the program steps of
- controlling said first DAC output and said second DAC output to generate said sweep delay for said object;
- setting said second DAC output to generate said IF signal for said background noise to dominate; and
- calibrating said first DAC output to establish said IF frequency.

15. The apparatus of claim 13, further comprising:
at least one of said traffic monitoring system, said traffic control system, said parking management system, and/or said production management system is adapted to communicate with at least one of said micro-radar, said wireless sensor node, said wireline sensor node, said processor, said access point and/or said server.

16. The apparatus of claim 1, wherein said compression ratio is one million to within one thousand.

17. The apparatus of claim 1, wherein said antenna output is compliant with an Ultra-Wide Band (UWB) signal protocol.

18. The apparatus of claim 1, wherein said IF signal has a frequency of between 6 Kilo (K) Hertz (Hz) and 7 KHz.

19. A method, comprising the step of:
operating a micro-radar transmitting an antenna output through an antenna to an object and receiving a Radio Frequency (RF) reflection off of said object, further comprising the steps of:
- responding to a first Digital to Analog Converter (DAC) output to generate a transmit signal with a first edge and a duty cycle;
- responding to a second DAC output to generate a reception signal with a second edge at a delay from said transmit first edge, where said delay sweeps through a short delay to a long delay over a time interval;
- operating a RF transceiver/mixer (RFTM) to generate a transmit RF burst in response to said first edge of said transmit signal;
- generating a reception pulse in response to said second edge of said reception signal; and
- operating said RFTM to mix said transmit RF burst and a received RF reflection in response to said reception pulse to generate an Intermediate Frequency (IF) signal with a peak amplitude at a sweep delay Tm for a distance T0 of said object from said antenna.

20. The method of claim 19, wherein the step of operating said micro-radar further comprises at least one of the steps of:
- calibrating said first DAC output based upon a duty cycle of said transmit pulse;
- calibrating said second DAC output based upon a compression ratio of said time interval divided by a difference between said long delay subtracted from said short delay;
- setting said second DAC output beyond said long delay to generate a background noise estimate from an Analog to Digital Converter (ADC) reading of said IF signal;
- processing said ADC reading to estimate said sweep delay Tm and/or said distance T0;
- processing said ADC reading based upon said background noise estimate to estimate said sweep delay Tm and/or said distance T0.

* * * * *